United States Patent
Saxe et al.

(12) 
(10) Patent No.: US 6,334,967 B1
(45) Date of Patent: Jan. 1, 2002

(54) LIGHT-POLARIZING PARTICLES OF IMPROVED PARTICLE SIZE DISTRIBUTION

(75) Inventors: Robert L. Saxe, New York; Barry Fanning, Patchogue; Steven M. Slovak, Massapequa, all of NY (US)

(73) Assignee: Rsearch Frontiers Incorporated, Woodbury, NY (US)

( * ) Notice: Subject to any disclaimer, the term of this patent is extended or adjusted under 35 U.S.C. 154(b) by 0 days.

(21) Appl. No.: 09/720,561

(22) PCT Filed: Jul. 9, 1999

(86) PCT No.: PCT/US99/15508

§ 371 Date: Dec. 21, 2000

§ 102(e) Date: Dec. 21, 2000

(87) PCT Pub. No.: WO00/03177

PCT Pub. Date: Jan. 20, 2000

Related U.S. Application Data

(60) Provisional application No. 60/092,198, filed on Jul. 9, 1998.

(51) Int. Cl.[7] .............................. F21V 9/14; G02B 26/00; G02B 5/30

(52) U.S. Cl. .......................... 252/585; 359/296; 264/1.31

(58) Field of Search ........................ 252/585; 359/296; 264/1.31

(56) References Cited

U.S. PATENT DOCUMENTS

| | | | |
|---|---|---|---|
| 2,041,138 A | 5/1936 | Land | 18/57 |
| 2,178,996 A | 11/1939 | Land | 252/6 |
| 2,289,712 A | 7/1942 | Land | 260/284 |
| 4,131,334 A | 12/1978 | Witte et al. | 359/485 |
| 4,247,175 A | 1/1981 | Saxe | 350/362 |
| 4,407,565 A | 10/1983 | Saxe | 350/374 |
| 4,422,963 A | 12/1983 | Thompson et al. | 252/583 |
| 4,877,313 A | 10/1989 | Saxe et al. | 350/391 |
| 5,002,701 A | 3/1991 | Saxe | 252/586 |
| 5,093,041 A | 3/1992 | Check, III et al. | 252/585 |
| 5,409,734 A | 4/1995 | Lee et al. | 427/163.1 |
| 5,463,491 A | 10/1995 | Check, III | 359/296 |
| 5,463,492 A | 10/1995 | Check, III | 359/296 |
| 5,516,463 A | 5/1996 | Check, III et al. | 252/585 |
| 5,650,872 A | 7/1997 | Saxe et al. | 359/296 |

*Primary Examiner*—Philip Tucker
(74) *Attorney, Agent, or Firm*—Greenberg Traurig, LLP

(57) ABSTRACT

A method of making particles of light-polarizing material comprising reacting a precursor suitable for forming polyhalide particles with elemental iodine and a hydrohalide or an ammonium, alkali metal, or alkaline earth metal halide wherein the average size and/or median size of the precursor is less than 1 micron.

12 Claims, No Drawings

LIGHT-POLARIZING PARTICLES OF IMPROVED PARTICLE SIZE DISTRIBUTION

This appln is a 371 of PCT/US99/15508 filed Jul. 9, 1999, which claims benefit of Prov. No. 60/092,198 filed Jul. 9, 1998.

FIELD OF THE INVENTION

The present invention relates to a method of making light-polarizing particles of improved particle size distribution for use in liquid suspensions and light valves, films, and set suspensions.

BACKGROUND

Light valves have been known for over sixty years for modulation of light. As used herein, a light valve may be described as a cell formed of two walls that are spaced apart by a small distance, at least one wall being transparent, the walls having electrodes thereon usually in the form of transparent conductive coatings. The cell contains a light-modulating element, which may be either a liquid suspension of particles or a plastic film in which droplets of a liquid suspension of particles are distributed and encapsulated.

The liquid suspension (sometimes herein called a liquid light valve suspension) comprises small particles suspended in a liquid suspending medium. In the absence of an applied electrical field, the particles in the liquid suspension exhibit random Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the light valve suspension in the light valve, the particles become aligned and for many suspensions most of the light can pass through the cell. The light valve is thus relatively transparent in the ON state.

Light valves have been proposed for many purposes including e.g., alpha-numeric displays, television displays, windows, sun roofs, sun visors, mirrors, eyeglasses and the like to control the amount of light passing therethrough. Light valves of the type described herein are also known as "suspended particle devices" or SPDs".

For many applications, it is preferable for the activatable material to be a plastic film rather than a liquid suspension. For example, in a light valve used as a variable light transmission window a plastic film in which droplets of liquid suspension are distributed is preferable to a liquid suspension alone because hydrostatic pressure effects e.g., bulging associated with a high column of liquid suspension can be avoided through use of a film, and the risk of possible leakage can also be avoided. Another advantage of using a plastic film is that in a plastic film the particles are generally present only within very small droplets, and hence do not noticeably agglomerate when the film is repeatedly activated with a voltage.

A "light valve film" as used herein is thus a film having droplets of a liquid suspension of particles distributed in the film.

A type of light valve film made by phase separation from a homogeneous solution is disclosed in U.S. Pat. No. 5,409,734. Light valve films made by cross-linking emulsions are disclosed in U.S. Pat. Nos. 5,463,491 and 5,463,492 assigned to the assignee of the present invention. All of those patents and other patents and other sources cited herein are incorporated herein by reference thereto.

For use in set suspensions such as light-polarizing sheets, sometimes called "sheet polarizers", which can be cut up and formed into polarized sunglass lenses or used as filters, light-polarizing particles can be dispersed or distributed throughout a sheet of suitable film-forming material, such as cellulose acetate or polyvinyl alcohol or the like. Methods of making set suspensions for use in sheet polarizers are well known in the prior art. In these set suspensions, however, the particles are immovable. See e.g., U.S. Pat. Nos. 2,178,996 and 2,041,138.

THE LIQUID LIGHT VALVE SUSPENSION

1. Liquid Suspending Media And Stabilizers

The liquid light valve suspension may be any liquid light valve suspension known in the art and may be formulated according to known techniques. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspension of the present invention may include any of the liquid suspending media previously proposed for use in light valves for suspending the particles. Liquid suspending media known in the art are useful herein, such as but not limited to the liquid suspending media disclosed in U.S. Pat. Nos. 4,247,175 and 4,407,565. In general one or both of the liquid suspending medium or the polymeric stabilizer dissolved therein is chosen so as to maintain the suspended particles in gravitational equilibrium.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described in U.S. Pat. No. 5,463,492.

2. Particles

As is known, inorganic and organic particles may be used in a light valve suspension. However, the present invention relates to an improved method of preparing particles that are polyhalides (sometimes referred to in the prior art as perhalides) of organic compounds, such as alkaloid acid salts and the like. The polyhalide particles of the present invention may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). As is known, if a polyhalide of an alkaloid acid salt is prepared, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting. Also, the particles may be particles of a hydrogenated polyhalide of a quinine alkaloid acid salt, such as dihydrocinchonidine sulfate polyiodide, as described in U.S. Pat. No. 4,131,334.

More recently, improved polyhalide particles having advantageous features for use in light valves have been proposed in U.S. Pat. Nos. 4,877,313, 5,002,701, 5,093,041 and 5,516,463. These "polyhalide particles" are formed by reacting organic compounds, usually containing nitrogen, with elemental iodine and a hydrohalide acid or an ammonium alkali metal halide or alkaline earth metal halide. Such organic compounds are referred to herein as a "Precursor".

Prior art polyhalide particles are also discussed in detail in "The Optical Properties and Structure of Polyiodides" by D. A. Godina and G. P. Faerman published in The Journal of General Chemistry, U.S.S.R. Vol. 20, pp. 1005–1016 (1950). Herapathite, for example, is quinine bisulfate polyiodide, and its formula is given under the heading "quinine iodosulfate" as $4C_{20}H_{24}N_2O_2.3H_2SO_4.2HI.I_4.6H_2O$ in The Merck Index, $10^{th}$ Ed. (Merck & Co., Inc., Rahway, N.J.). In polyiodide compounds, the iodide anion is thought to form chains and the compounds are strong light polarizers. See U.S. Pat. No. 4,877,313 and Teitelbaum et al. JACS 100 (1978), pp. 3215–3217. The term "polyhalide" is used herein to mean a compound such as a polyiodide, but wherein at least some of the iodide anion may be replaced by another halide anion.

As is known, polyhalide particles that are useful for light valves are preferably of colloidal size, that is the particles will have a largest dimension averaging about 1 micron or less. It is preferred that most polyhalide particles have their largest dimension less than one-half of the wavelength of blue light i.e., 2000 Angstroms or less to keep light scatter extremely low.

DESCRIPTION OF THE INVENTION

The present invention provides a method of preparing polyhalide particles that are especially well suited for use as the particles of a liquid light valve suspension, which comprises reacting a "Precursor" of a specified particle size with elemental iodine and a hydrohalide acid or an ammonium, alkali metal or alkaline earth metal halide. The Precursor may be any of the compounds previously used to form organic polyhalide particles by reaction with elemental iodine and a hydrohalide acid or an ammonium, alkali metal or alkaline earth metal halide. For example, the Precursor may be a quinine alkaloid acid salt (U.S. Pat. Nos. 2,178,996 and 2,289,712), a hydrogenated alkaloid acid salt (U.S. Pat. No. 4,131,334) or an organic compound containing one or more groups that chelate hydrogen, ammonium or metal ions (U.S. Pat. Nos. 4,877,313, 5,002,701, 5,093,041 and 5,516,463), all of such U.S. patents being incorporated herein by reference thereto. The Precursor can be any color but generally is comprised of small white or off-white colored crystals (sometimes referred to herein as "particles").

We have surprisingly found that if the average size and/or median size of the Precursor is less than 1 micron, preferably less than 0.75 micron, the quality of the polyhalide particles made therefrom is substantially improved. Comminution (size reduction) of the Precursor particles to provide the desired particle size may be accomplished by any means that reduces their size, provided that the process does not cause the comminuted particles to cluster or clump up, which could offset the advantages of comminution and might actually cause the effective size of the particles to increase. For example, the Precursor particles can be pulverized or ground with a mortar and pestle or with a ball mill or any other convenient means, either dry or wet with a liquid, or with another solid inert substance present to aid pulverization. Alternatively, the Precursor particles can be caused to collide with one another by being subjected to rapidly moving gas streams, for example, by being blasted with a supersonic stream or streams of air.

As used herein, if Precursor particles or crystals are said to have been comminuted or reduced in size, what is meant is that their average size and/or their median size has been reduced. The "size" of a particle as used herein means and refers to the particle's largest dimension.

The present invention is illustrated in terms of its preferred embodiments in the following Examples.

A typical modern prior art type of polyhalide particle (crystal) is pyrazine-2,5-dicarboxylic acid dihydrate calcium iodide polyiodide. A procedure for making such crystals and a liquid suspension thereof for use in a light valve is disclosed in Example 1.

EXAMPLE 1 (PRIOR ART)

Formulation For Making Polyiodide Crystals And A Liquid Light Valve Suspension Thereof In an appropriate size jar add, in the order shown, the following reactants:

| | |
|---|---|
| 160 g. | a solution of 6.98% ¼ sec ss-type nitrocellulose (dry), dissolved in hexyl acetate |
| 3 g. | pyrazine-2,5-dicarboxylic acid dihydrate (the "Precursor") |
| 4.5 g. | iodine |
| 2.64 g. | anhydrous calcium iodide |
| 1.8 g. | anhydrous methanol |
| 0.33 g. | water |

Cap jar and shake for approximately ½ hour. Place jar in ultrasonic sonicator until solution turns completely blue, about 10 hours. Inspect solution under microscope to determine that the Precursor, $CaI_2$ and $I_2$ are fully reacted i.e., that there is no substantial amount of unreacted Precursor. Maximum yield is obtained when the initial decay time is between 8–15 milliseconds. If the decay time is less than 8 milliseconds rerun the formulation with about 0.05 g. $H_2O$ added after the methanol.

The decay time is determined by the following procedure. A suspension of the formed particles in a light valve suspending medium is filled into a light valve cell comprising glass sheets carrying suitable electrodes, spaced 5 mils apart. The light valve suspension is illuminated with continuous illumination such as from a tungsten lamp. The suspension of particles in the light valve is energized by applying to the electrodes about 55 volts at 10 kHz to a baseline measurement. About 2–3 milliseconds are required to reach an open state of the light valve, and approximately 20 milliseconds thereafter the electrical field is discontinued. Decay to the fully closed (off) state of the light valve is measured thereafter. (See col. 2, lines 37–48 of U.S. Pat. No. 5,516,463.)

Centrifuge the solution at 11,500 RPM for 1 hour and discard the supernatant. Drain tubes upside down on paper towel for 15 minutes. Put the sediment from the tubes in tarred glass jar and record the sediment weight. Add 15 g. hexyl acetate for each gram of sediment. Disperse sediment by shaking for ½ hour followed by 10 hours of ultrasonic sonication.

Centrifuge dispersion at 2500 RPM for 5–15 minutes and decant and collect supernatant. The decay time should be 8 to 12 milliseconds; if higher, recentrifuge supernatant.

Centrifuge supernatant at 9,500 RPM for ½ hour and discard the supernatant. Drain tubes upside down on paper towel for 15 minutes. Collect sediment in a tarred glass jar and add 10 g. of anhydrous isopentyl acetate for each gram of sediment. Disperse sediment by shaking for ½ hour followed by 10 hours of sonication. This is referred to below as the "initial concentrate".

Tri-n-pentyl-trimellitate (TNPTM), which is a plasticizer liquid as described in col. 4, lines 48–66 of U.S. Pat. No. 5,463,491, is added to the initial concentrate in an amount of 9 g. and the combination placed in a Rotovap apparatus for 2 hours at 60° C. to evaporate the isopentyl acetate. The amount of TNPTM to be added can be determined empirically depending on how concentrated with particles one desires the resulting final concentrate (i.e., the dried initial concentrate) to be. The final concentrate can then be diluted with any other desired solvent or solvents in which the concentrate polymer is soluble. Other plasticizer liquids can be used.

To prepare a concentrate for use in an SPD light valve film, in accordance with the teachings of one embodiment of U.S. Pat. No. 5,463,492, instead of adding TNPTM to the abovementioned initial concentrate before evaporating the isopentyl acetate, one can add a liquid polymer such as a copolymer of n-butyl acrylate/heptafluorobutyl acrylate/hydroxyethyl acrylate.

Various modifications of the aforesaid procedure for making polyiodide crystals can be made such as changing the quantities of some of the reactants, altering the centrifugation times or procedure, or varying the ultrasonic sonication.

Example 2 sets forth a prior art method of making the Precursor material used in Example 1, namely pyrazine-2,5-dicarboxylic acid dihydrate.

EXAMPLE 2 (PRIOR ART)

Procedure for Making Pyrazine-2.5-Dicarboxylic Acid Dihydrate 2,5-dimethylpyrazine (25 g), pyridine (500 ml), selenium dioxide (125 g) and water (50 ml) were introduced into a 1 liter roundbottom flask, equipped with a mechanical stirrer and a reflux condenser. The mixture was refluxed for 11–12 hours; the boiling solution assumes an orange-red color after about 20 minutes while selenium is gradually precipitated.

The suspension is allowed to cool to room temperature, and the precipitate, a mixture of pyrazine 2,5-dicarboxylic acid and selenium, is filtered off. Flask and stirrer are rinsed out with the filtered reaction solvent. The reaction solvent is returned to the flask and reused. The precipitate is washed with 2N $NH_4$ OH until all of the pyrazine 2,5-dicarboxylic acid is dissolved. The 2N $NH_4OH$ with pyrazine 2,5-dicarboxylic acid is run through a chromatography column of slurried Darco activated carbon (12–20 mesh, 250 g) at a rate of 30 ml/min.

Concentrated hydrochloric acid (100 ml) was added to 400 ml-portions of the colorless eluent to give a white precipitate of pyrazine 2,5-dicarboxylic acid, which was filtered off, washed with 20 ml of 2N hydrochloric acid and the with 20 ml of ice-cold water, followed by 20 ml of acetone. After air drying the precipitate until the odor of acetone is gone, the Precursor, which is pyrazine 2,5-dicarboxylic acid dihydrate, is ready to use.

In order to be able to demonstrate that the present invention has improved the quality of the polyhalide particles referred to herein, and in order to quantify that improvement, several terms need to be defined. The optical density of a light valve window test cell in the unactivated condition is its off-state optical density or "$OD_{off}$". When a voltage is applied to the test cell's conductive transparent coatings (electrodes) particles in the liquid suspension or film contained in the cell orient, causing light transmission to increase and causing the optical density to decrease. This decreased optical density when the cell is activated or turned on is referred to herein as "$OD_{on}$". For the tests described herein a voltage of 55 volts RMS is applied at a frequency of 10 Kilohertz using a test cell which has an internal gap of 5 mils between its electrodes. Hence the field strength applied in a test cell would be 11 volts RMS per mil. $OD_{off}$ divided by $OD_{on}$ is referred to herein as the optical density ratio or ODR. In Example 1 above a procedure is disclosed for measuring the decay time of a liquid suspension, $t_d$, in a test cell. In general, one desires a light valve liquid suspension to have a large ODR and a small $t_d$. Therefore, to measure the overall quality of a suspension we define its efficiency, E, as its ODR divided by its $t_d$ measured in seconds. Thus for a liquid suspension having an optical density ratio of 2.0 and a decay time of 18 milliseconds (.018 sec.), its efficiency would be calculated as follows:

$$E = \frac{1.0}{.018} = 111$$

The higher that E can be made, the better.

EXAMPLE 3A

In an Erlenmeyer flask the following materials in the quantities shown were dissolved into 132.5 g. of a hexyl acetate solution (including 0.11 g. of water) comprising 6.98% of dissolved ¼ ss-type nitrocellulose:

| | |
|---|---|
| 4.5 g. | iodine |
| 2.64 g. | anhydrous calcium iodide |
| 1.8 g. | methanol |
| 0.53 g | water. |

Then 3 g. of pyrazine-2,5-dicarboxylic acid dihydrate (Precursor) made by the prior art method described in Example 2 above, was added to the aforesaid solution, and the flask was placed for 3 hours at 45° C. in a Waterbath Shaker Model-WB-20 manufactured by Elmeco Engineering, Rockville, Md. Then the suspension was ultrasonically agitated for two hours. The particle size of the Precursor is reported in Table 1, below.

EXAMPLE 3B

Example 3A was repeated except that the Precursor had been previously comminuted by a supplier (Aveka, Inc., Woodbury, Minn.) in a machine referred to herein as a "pancake mill" which utilizes supersonic air streams to cause Precursor particles to collide violently with one another. The particle size of the Precursor is reported in Table 1, below.

The suspensions of Examples 3A and 3B were removed from the Erlenmeyer flasks and centrifuged following the procedure of Example 1 to obtain the initial concentrate.

Table 1 summarizes the data for each of the suspension described in Examples 3A and 3B with respect to ODR, decay time, efficiency, and the average and median sizes of the Precursor particles used.

TABLE 1

Comparison Of Data For Two Polyiodide Suspensions, The First Made With A Precursor Made By The Prior Art Method And The Second Made With A Comminuted Precursor

| | Size of Precursor Particles Used | | Optical* Density Ratio | Decay* Time | Effi- ciency* |
|---|---|---|---|---|---|
| | Average Size | Median Size | | | |
| Example 3A | 6.33 microns | 1.12 microns | 3.13 | 23 ms | 136 |
| Example 3B | 0.74 micron | 0.68 micron | 3.00 | 10.5 ms | 285 |

*For the initial concentrate (as described in Example 1), but with only 2 hours of sonication after the initial reaction, and additional shaking and two hours of sonication after each of the first and third centrifugation steps.

In addition to pyrazine-2,5-dicarboxylic acid dihydrate, any solid Precursor used in the prior art or invented hereinafter, which can be used to make polyhalide particles, can be comminuted advantageously as disclosed in the present invention.

Although we do not wish to be bound to any particular theory as to why comminution leads to enchanced polyhalide particle efficiency we think that comminution may enhance efficiency by enabling more small particles to be formed and begin growth at about the same time, and may therefore yield a suspension that is less polydisperse in particle size distribution than prior art suspensions.

What is claimed is:

1. A method of making particles of light-polarizing material comprising reacting a precursor suitable for forming polyhalide particles with elemental iodine and a hydrohalide acid or an ammonium, alkali metal or alkaline earth metal halide wherein the average size and/or median size of the precursor is less than 1 micron.

2. The method of claim 1, wherein the average and/or median size of the precursor is less than 0.75 micron.

3. The method of claim 1, further comprising providing a desired particle size for the precursor prior to reaction by means which reduces the precursor particle size without causing the reduced size particles to cluster or clump up.

4. The method of claim 1, wherein the precursors are polyhalides of organic compounds.

5. The method of claim 4, wherein the polyhalides of organic compounds are alkaloid acid salts and the like.

6. The method of claim 1, wherein the precursors are organic compounds containing nitrogen.

7. The method of claim 1, wherein the precursors are a quinine alkaloid salt.

8. The method of claim 1, wherein the precursors are organic compounds containing one or more groups that chelate hydrogen, ammonium or metal ions.

9. The particle prepared by the method of claim 1.

10. In a light valve, comprising a cell containing a suspension of light-polarizing particles in a liquid suspending medium, the improvement wherein the particles are the particles according to claim 1.

11. A light-polarizing body comprising a plurality of particles according to claim 9, dispersed in a carrier, the polarizing axis of the particles being oriented and immovably retained by the carrier in substantial parallelism.

12. A liquid suspension comprising an electrically resistive liquid suspending medium, a plurality of small anisometrically shaped particles according to claim 9 dispersed therein and at least one stabilizing polymer material dissolved therein for dispersing the particles in the suspension.

* * * * *